United States Patent [19]
Guenin

[11] Patent Number: 5,028,492
[45] Date of Patent: Jul. 2, 1991

[54] COMPOSITE COATING FOR ELECTRICAL CONNECTORS

[75] Inventor: Bruce M. Guenin, Guilford, Conn.

[73] Assignee: Olin Corporation, New Haven, Conn.

[21] Appl. No.: 492,149

[22] Filed: Mar. 13, 1990

[51] Int. Cl.$^5$ ............................................ H01R 13/03
[52] U.S. Cl. ........................... 428/614; 428/644; 428/645; 428/647; 428/929; 439/886; 439/931
[58] Field of Search ............... 428/614, 643, 645, 644, 428/647, 646, 929, 931; 439/886, 887, 931

[56] References Cited

U.S. PATENT DOCUMENTS

| | | | |
|---|---|---|---|
| 2,319,246 | 5/1943 | Larsen et al. | 200/265 |
| 3,268,851 | 8/1966 | Mancini | 439/887 |
| 3,808,111 | 4/1974 | Hovey et al. | 204/56 R |
| 3,818,415 | 6/1974 | Evans et al. | 439/886 |
| 4,312,772 | 1/1982 | Mori | 252/12.2 |
| 4,404,263 | 9/1983 | Hodes et al. | 204/192.05 |
| 4,498,727 | 2/1985 | Steinmetz et al. | 439/887 |
| 4,665,113 | 5/1987 | Eberl | 524/156 |
| 4,666,787 | 5/1987 | Bickle et al. | 428/550 |
| 4,732,818 | 3/1988 | Pratt et al. | 428/547 |
| 4,868,067 | 9/1989 | Fujisawa et al. | 428/614 |
| 4,941,919 | 7/1990 | Asada et al. | 75/235 |

FOREIGN PATENT DOCUMENTS

| | | | |
|---|---|---|---|
| 1038150 | 4/1958 | Fed. Rep. of Germany | 439/886 |
| 1182491 | 2/1970 | United Kingdom | 439/887 |

OTHER PUBLICATIONS

E. H. Melan et al., Electrically Conductive Adhesive, IBM Technical Disclosure Bulletin, vol. 8, No. 9, Feb. 1966, p. 1203, 439/887.

Mottine et al., "The Effect of Lubrication on Fretting Corrosion at Dissimilar Metal Interfaces in Socketed IC Device Applications", Thirtieth Annual Holm Conference on Electrical Contacts, 1984. (pp. 171-183).

Yasuda et al., "Degradation Mechanisms in Tin and Gold Plated Connector Contacts", Thirty Second Annual Meeting IEEE Holm Conference on Electrical Contacts, 1986, (pp. 27-33).

Lee et al., "Fretting Corrosion of Tin-Plated Copper-Alloy", appearing in Thirty Second Annual Meeting IEEE Holm Conference on Electrical Contacts, 1986, pp. 45-60.

Dean et al., "Tinplate and Tin Coating Technology", appearing in Journal of Metals, Aug. 1987, (pp. 42-45).

Ebdon, "The Performance of Electroless Nickel/PTFE Composites", appearing in Plating and Surface Finishing. Sept. 1988, (pp. 65-68).

Spire Corporation, product disclosure (undated).

Primary Examiner—John J. Zimmerman
Attorney, Agent, or Firm—Gregory S. Rosenblatt; Paul Weinstein

[57] ABSTRACT

A composite coating for electrical connectors is provided. The coating contains a ductile metal matrix and an uniformly dispersed polymer component. The polymer component is present in a concentration effective to reduce frictional forces generated when inserting an insertion component into a socket. The composite coating has lower friction and improved fretting corrosion resistance as compared to an electrodeposited tin coating. One preferred coating contains 0.5 weight percent polytetrafluoroethylene in a tin matrix.

10 Claims, 1 Drawing Sheet

COMPOSITE COATING FOR ELECTRICAL CONNECTORS

BACKGROUND OF THE INVENTION

This invention is particularly suited as a coating material for electrical connectors. More specifically, a composite material containing a ductile metal and a polymer is provided. The coating reduces the frictional force generated within an electrical connector minimizing insertion and fretting wear.

Electrical interconnection between two devices may be achieved by inserting an insertion component such as a pin or blade into a mating socket. Both the insertion component and the socket are manufactured from a material having low bulk resistivity such as copper or a copper alloy. The socket is usually imparted with a spring temper to exert a compressive force. The compressive force keeps the insertion component in place and decreases contact resistance between the socket and insertion component.

The selection of a copper alloy for the components of an electrical connector minimizes bulk resistivity. Contact resistance, the resistance (in ohms) between the mated components of a connector, is equally as important. Contact resistance is dependent on bulk resistivity and the interface between the insertion component and the socket.

On a microscopic scale, this interface is comprised of a number of contact spots. The contact resistance is dependent on the number of conductive contact spots (known as "a-spots") and the area of each conductive spot. The larger the aggregate area of a-spots, the lower the contact resistance. The number and area of contact spots is variable. Over time, oxidation may reduce the area of the a-spots. Further degradation may occur due to wear resulting in the accumulation of debris within the contact region to reduce the conductive contact area. As the total area of a-spots decreases, contact resistance increases. The increasing contact resistance leads to an increasing voltage drop across the electrical connector. When the voltage drop becomes too severe, connector failure results.

Copper and copper alloys readily oxidize at elevated temperatures and will gradually oxidize at room temperature. Certain copper alloys are relatively oxide resistant at low temperature operations and suitable for certain electrical applications without a coating. For example, in high voltage, room temperature applications such as household appliances, electrical requirements are satisfied by uncoated copper alloy C260 (cartridge brass having the nominal composition 70% copper/30% zinc). For lower voltage applications where precise measurements are required or where elevated temperatures may be experienced, the connector and socket are coated with an oxidation resistant metal such as tin, gold and lead/tin alloys. A thin coating, on the order of 1-4 microns, is applied to the connector by a process such as electrolytic deposition, electroless deposition or, for low melting metals and alloys, by hot dipping.

Each coating has certain inherent limitations. Gold is a soft metal and does not oxidize. Gold alloys are harder and generally oxide resistant. The high cost of the metal limits its use as a coating to those connectors requiring extremely high reliability.

Tin and tin/lead alloy coatings form surface oxide layers. The coatings distort during insertion. The thin oxide layer is fractured in the contact region and a fresh, unoxidized surface makes contact within the electrical connector. Repeated insertion and removal of the connector will lead to insertion wear. The soft metal coating gradually erodes, exposing the copper alloy connector substrate. The exposed substrate will oxidize increasing contact resistance.

Even if the insertion component is not repeatedly inserted and removed from the socket, wear is a problem. Fretting corrosion may occur. Fretting corrosion is surface damage usually manifest in an oxidizing environment when two surfaces, one or both of which are metals, are in close contact, under pressure, and subject to slight relative motion. Connector assemblies in automotive and industrial applications are often subject to some form of vibration. Thermal expansion and contraction of the connector components also causes minute relative movement between the mated contacts. Each small movement exposes fresh metal. As the fresh metal oxidizes, oxide debris accumulates. The slight fretting motion, on the order of a few microns, is not sufficient to remove the debris from the contact area. The debris, which contain tin oxide ($SnO_2$), increases the contact resistance of the connector.

One method to minimize insertion wear and to reduce fretting corrosion is to deposit an external thixotropic lubricant. One lubricant which has been used for many years on rotary dials is a grease composed of a mixture of 2-diethyl hexyl sebacate and high molecular weight methacrylate polymer. The lubricants extend the lifetime of the metal connector coating and do not adversely effect the contact resistivity. Externally applied coatings are subject to misapplication by the connector assembler, possibly contaminating other electronic components. The subsequent evaporation of the lubricant and the entrapment of dust both may lead to an increase in the contact resistance.

Inorganic, nonmetallic particulate materials have been blended into coatings to increase hardness and wear resistance and to reduce friction. Among the composite coatings of tin are mixtures with silicon carbide, aluminum oxide, tungsten carbide and molybdenum disulfide. Composite coatings formed from a mixture of tin and the first three additives are harder than pure tin and tend to have high contact resistance. Composites of tin and molybdenum disulfide while relatively soft, do not maintain a low contact resistance under fretting conditions.

A composite of tin and an organic particulate has been applied to decrease frictional wear in bearings. U.S. Pat. No. 4,665,113 discloses a joint agglomeration of granular polytetrafluoroethylene (PTFE) and a metal containing filler selected to be copper, tin or their alloys. The agglomeration is then molded into slide bearings. PTFE is known by the trademark "TEFLON TM" (DuPont Corporation, Wilmington, Del.). The filler occupies from 1 to 75 percent by weight of the agglomeration.

U.S. Pat. No. 4,312,772 discloses another bearing material. A porous layer of copper or a copper base alloy is formed on a steel backing sheet. The porous layer is impregnated with a mixture of lead fluoride, lead or lead/tin alloy, and PTFE. Depending on the application, additional additives such as molybdenum, tungsten disulfide, cadmium oxide, aluminum oxide, calcium fluoride, lithium fluoride, graphite, lead iodide, glass fibers, carbon fibers and a phosphate may be added to the mixture.

Bearing materials are designed to minimize friction and maximize durability. Electrical requirements are not a consideration. The bearing materials have a relatively high concentration of PTFE and are unsuitable as coatings for electrical contacts. The Applicant has discovered that within a limited compositional range and within a limited polymer particle size range a coating material for electrical contacts from a composite of tin and PTFE may be formed. The composite coating has excellent electrical characteristics and improved wear properties.

SUMMARY OF THE INVENTION

Accordingly, it is an object of the invention to provide a coating material for electrical connectors which has improved wear properties and low contact resistance. It is a feature of the invention that the coating material is a composite made up of a mixture of a ductile metal and a polymer. It is an advantage of the invention that no external lubricants are required. It is a further advantage of the invention that the coating has low initial contact resistance and the number of cycles required to raise the contact resistance above a maximum threshold is increased. Yet another advantage of the invention is that the frictional force of insertion is reduced by up to 80% over conventional electrodeposited tin. Still another advantage of the invention is that the fretting lifetime is increased by up to 3 times over that of conventional electrodeposited tin.

Accordingly, there is provided a composite coating for electrical contacts. The coating is a mixture of a ductile metal and a polymer. The concentration of the polymer is that effective to reduce the frictional force of insertion without increasing the initial contact resistance above about 10 milliohms.

BRIEF DESCRIPTION OF THE DRAWINGS

The objects, features and advantages stated above will become more clear from the specification and drawings which follow.

DESCRIPTION OF THE PREFERRED EMBODIMENTS

In accordance with the invention a composite material suitable for coating connectors is formed by mixing a ductile metal and a polymer. The polymer component is uniformly dispersed throughout a metal matrix. High electrical conductivity is required. The coating has an initial contact resistance below about 10 milliohms. An effective ratio of polymer to ductile metal is that amount of polymer which reduces frictional force without increasing the initial contact resistivity above about 10 milliohms. For a composite of tin and PTFE, the weight percent PTFE is preferably up to about 0.7%.

To evaluate the composite materials, tin/PTFE samples were evaluated using a fretting apparatus. The apparatus comprises an arm which wipes across the test sample. The distance of arm travel and the applied load may both be specified. The moving arm simulates the minuscule vibrations which cause fretting corrosion in a contact assembly. Applicant employed a wipe distance of 20 microns and an applied load of 50 grams. The portion of the fretting apparatus arm contacting the composite coating had a formed bump with a radius of curvature of 1.6 millimeters. The results for tin/PTFE buttons formed according to the process of the invention were as follows:

| PTFE Loading (Weight percent) | Initial Contact Resistance (milliohms) | Frictional Force (gmf) | Cycles for Contact Resistance to exceed 100 milliohms |
|---|---|---|---|
| 0.25 | 2 | 25 | 9 |
| 0.5 | 4 | 8 | 1,300 |
| 1.0 | 100 | 3 | 3,200 |
| 5.0 | 1670 | — | — |

A connector having a pure electrodeposited tin coating (coating thickness 1.8 microns) was evaluated using the same fretting apparatus and conditions as specified for the composite. The average of measurements taken on four tin coatings was as follows:

Initial contact resistance: 3.3+/−0.6 milliohms
Friction force: 42+/−14 gmf
Cycles to exceed 100 milliohms 365+/−114.

The composite coatings of the invention demonstrated a significant reduction in frictional force. The number of cycles until contact resistance exceeded 100 milliohms was significantly increased. Both improvements over conventional electrodeposited tin coatings occurred without an increase in the initial contact resistance. A composite having 0.5% PTFE in tin demonstrated an 80% reduction in frictional force and in excess of a 3X increase in fretting life time.

Figure 1:
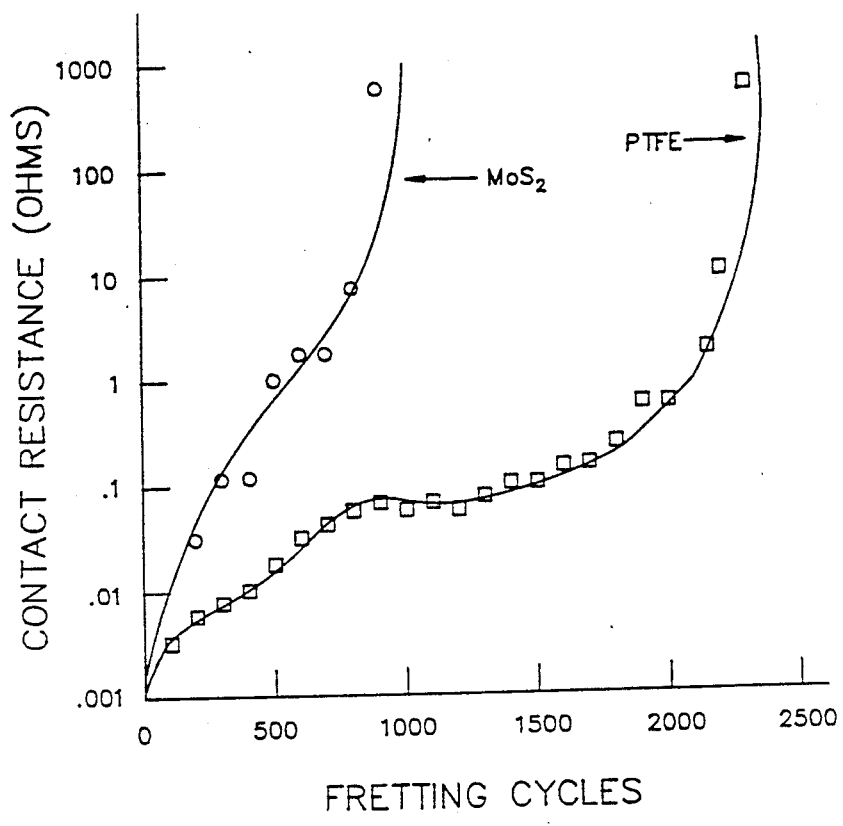
FIG. 1 illustrates the contact resistance as a function of fretting cycles for tin/PTFE and tin/$MoS_2$ composites.

A pellet of a coating containing 99% by weight tin and 1% molybdenum disulfide was produced. The contact resistance as a function of fretting cycles was compared to that of the composite of the invention. As shown in FIG. 1, the number of cycles until the contact resistance exceeded 100 milliohms was almost 5 times higher with the composite of the invention than with a composite of tin and $MoS_2$.

The frictional force decreases as the PTFE loading increases. The initial contact resistance increases with increasing PTFE concentration. An initial contact resistance of less than about 10 milliohms is desired. A maximum PTFE loading of about 0.7 weight percent satisfies the contact resistance requirement. Optimum results are achieved when the frictional force is less than about 10 gmf and the contact resistance is less than about 10 milliohms. Most preferred tin/PTFE composites contains from about 0.4 weight percent PTFE to about 0.7 PTFE.

The concentration ratio may vary depending on the polymer and metal matrix selected. The means of coating preparation and deposition on a connector also influence the ratio. By measuring both the contact resistance and the frictional force the optimum parameters may be determined. The proper composition for a specific application may be readily determined according to the process of the invention.

The composite materials of the invention may be formed by any suitable process. For improved homogeneity, both the ductile metal and the polymer may be provided in powder form. The particles should preferably be small. A small particle size is especially critical for the polymer component to ensure a uniform dispersion throughout the metal matrix. An average maximum particle size of about 5 microns is desirable. Preferably, the average size of the polymer particles is on the order of from about 0.5 micron to about 3 microns.

The ductile metal particles may be any soft metal having good electrical conductivity. The metal should further be selected not to oxidize readily. The oxide should form a thin surface coating rather than a thick porous layer. Any metal or metal alloy meeting these requirements is suitable. Preferred materials include tin, lead and alloys of tin and lead, indium and silver. Tin/lead alloys having from 0% to 100% tin are acceptable as are tin/indium and tin/silver alloys having in excess of about 90% by weight tin. Essentially pure tin is most preferred.

Any non-reactive polymer having low friction and thermal stability up to the service temperature of the connector is satisfactory. For tin plated connectors, the maximum service temperature is about 200° C. Among the preferred polymers are polyimide, polyamide and PTFE. PTFE is most preferred because of low reactivity, high thermal stability and good lubricity.

The composite material may be prepared in bulk form or as a coating. One method of forming the bulk composite is to mix ductile metal and polymer particles by conventional means such as ball milling. To improve the homogeneity of the mixture, the particle sizes of the metal and polymer component are selected to be about equal. A small amount of deionized water may be added to the mixture to increase cohesion. The wetted mixture is rolled into flakes by passing the mixture through a pair of steel rollers. The flakes are then dried and pressed into pellets by cold pressing in a die. Other compaction techniques such as warm pressing may also be used.

The bulk material may be bonded to a connector substrate by any suitable means. The pellets may be pressed into a strip. The strip is then clad to a copper alloy connector substrate by passing both through a rolling mill.

Alternatively, the coating may be deposited directly on the connector. It is possible to incorporate polymer particles such as PTFE into either an electroless or electrolytic plating process if the particles are well dispersed in the plating bath. Any suitable electrolyte may be used for the deposition process. If the ductile metal matrix is to be tin, then a tin sulfate bath (an aqueous solution containing 15-60 gm/l tin sulfate and 8-12 volume percent sulfuric acid) is an exemplary electrolyte. The particulate is suspended in the electrolyte. Agitation or some other means to keep the polymer dispersed in the liquid may be required. A connector substrate is then immersed in the electrolyte and impressed with a negative bias to form the cathode. An anode is immersed in the electrolyte and a current density sufficient to form a coating layer having a thickness of from about 1 to about 3 microns is applied.

The tin ions are driven to the cathode. The tin ions bond to the connector substrate trapping a uniform dispersion of polymer particles within a tin matrix.

Another suitable process is dry plating. The connectors, ductile metal particulate and polymer particulate are placed in a rotating barrel with a shot medium. The shot is harder than either particulate and drives both the ductile metal and polymer into the surface of the connector.

Figure 2:
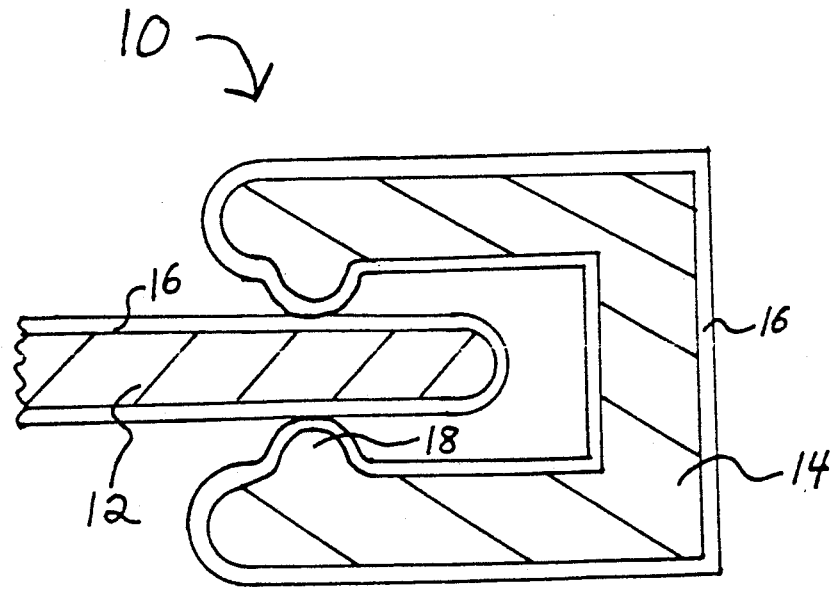
FIG. 2 illustrates in cross-sectional representation an electrical connector coated with the composite coating of the invention.

FIG. 2 illustrates in cross-sectional representation an electrical connector 10 in accordance with the invention. The connector 10 includes a copper or copper alloy insertion component 12 and a copper or copper alloy socket 14. A composite coating 16 comprising a ductile metal matrix and a uniformly dispersed polymer particulate as described above coats both the insertion component 12 and the socket 14. The composite coating decreases the frictional forces leading to wear at the contact points 18. The preferred coating is a tin matrix with a PTFE dispersion having a thickness of from about 1 to about 3 microns. The loading of PTFE should be below about 0.7 wt to maintain initial contact resistance below about 10 milliohms. Most preferably, the concentration of PTFE is from about 0.4 to about 0.7 weight percent.

While the invention has been described in terms of coatings for electrical connectors, the coating is suitable for any electrical application requiring a minimum of friction. The coating has particular utility in switches and relays as well.

The patents set forth in this application are intended to be incorporated in their entirety by reference herein.

It is apparent that there has been provided in accordance with the present invention a composite coating for electrical connector applications which fully satisfies the objects, means and advantages set forth herein above. While the invention has been described in combination with the embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A composite coating, comprising:
   a ductile metal matrix selected from the group consisting of tin, lead, tin/lead alloys, tin/indium alloys having in excess of about 90% tin and tin/silver alloys having in excess of about 90% tin; and
   a uniformly dispersed polymer component selected from the group consisting of polyimide, polyamide and polytetrafluoroethylene, wherein said polymer component is present in an amount effective to reduce friction without increasing the initial contact resistance above about 10 milliohms.

2. The composite coating of claim 1 wherein said polymer component is a particulate having a maximum size of about 5 microns.

3. The composite coating of claim 2 wherein said polymer component is a particulate having a size of from about 0.5 to about 3 microns.

4. The composite coating of claim 2 wherein said ductile metal component is tin and said polymer component is PTFE.

5. The composite coating of claim 4 wherein the concentration of PTFE is an effective amount up to about 0.7 weight percent.

6. The composite coating of claim 5 wherein the concentration of said polymer component is from about 0.4 to about 0.7 weight percent.

7. An electrical connector, comprising:
   a copper or copper alloy insertion component;
   a copper or copper alloy socket; and
   a composite coating on both said insertion component and said socket, said coating consisting essentially of a ductile metal matrix and a polymer dispersed throughout said matrix wherein said polymer is present in an amount effective to reduce friction and wherein the initial contact resistance is less than about 10 milliohms and said ductile metal component is selected from the group consisting of tin, lead, tin/lead alloys, tin/indium alloys having in excess of about 90% tin and tin/silver alloys having in excess of about 90% tin; and said polymer is selected from the group consisting of polyimide, polyamide and polytetrafluoroethylene.

8. An electrical connector, comprising:
a copper or copper alloy insertion component;
a copper or copper alloy socket; and
a composite coating on both said insertion component and said socket, the composition of said composite coating being a tin matrix containing up to about 0.7 weight percent PTFE dispersed throughout said tin matrix such that the initial contact resistance of said electrical connector is less than 10 milliohms.

9. The electrical connector of claim 8 wherein the composition of said composite coating is from about 0.4 to about 0.7 weight percent PTFE and the balance tin.

10. The electrical connector of claim 8 wherein the thickness of said composite coating is from about 1 to about 3 microns.

* * * * *